Jan. 31, 1967 R. D. LICHTI 3,300,839
METHOD OF MAKING CAMBERED BEAMS
Filed July 1, 1963
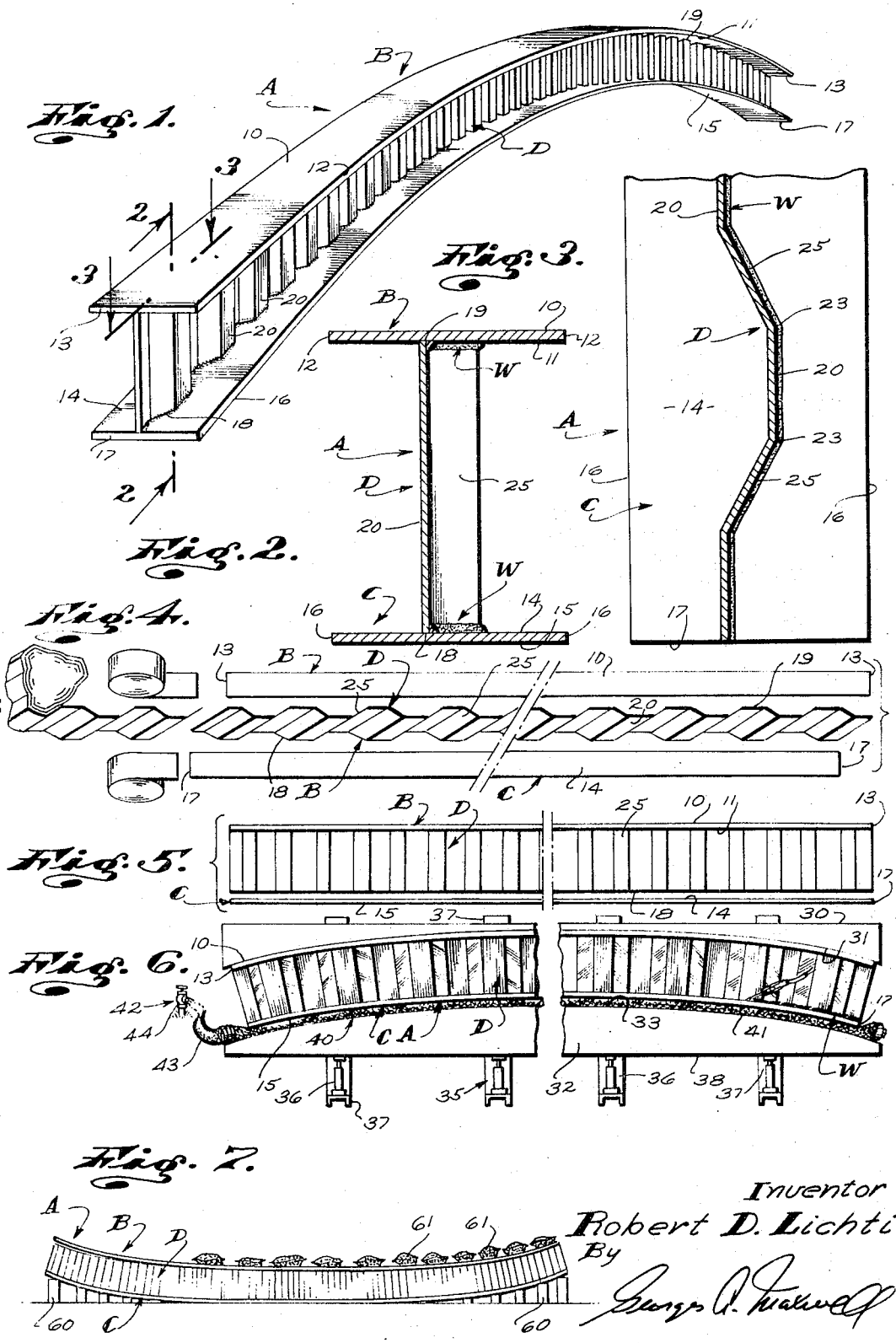
Inventor
Robert D. Lichti
By
George A. Maxwell United States Patent Office 3,300,839
Patented Jan. 31, 1967

3,300,839
METHOD OF MAKING CAMBERED BEAMS
Robert D. Lichti, Long Beach, Calif. (% Lihap Industries, 11834 S. Bloomfield Ave., Santa Fe Springs, Calif. 90670)
Filed July 1, 1963, Ser. No. 291,827
5 Claims. (Cl. 29—155)

This invention relates to a novel method of making cambered beams or joists.

The use of steel H-beams or I-beams in the construction industry is extremely old and highly developed. The ordinary or conventional H-beam or I-beam is an elongate, straight horizontally-disposed mild steel structure of uniform cross-section throughout its longitudinal extent and is established by fabricating or welding, or is formed of mild steel by a suitable roll mill operation.

In the design of a beam, as in the design of any object built for strength, consideration is first given to the selection of the most desirable or best structural material that can be used, and second, consideration is given to the most effective and efficient use or disposition of the material so that maximum strength can be obtained from a minimum weight of material.

Since the ordinary mild steel, milled I- or H-beam is necessarily formed of a single material, thereby preventing an advantageous union or marriage of several different materials, since such beams are necessarily straight and of uniform cross-section throughout their longitudinal extent, and since there is a practical limitation as to how thin the webs and flanges or cord members can be milled or rolled, the ability to reduce the weight of such beams to any material extent, so as to provide a light weight beam, is materially restricted.

In the ordinary joist, or horizontally disposed load-supporting beam, whether in the form of an I-beam or an H-beam, the vertical load is applied to the top of the beam. This load is transmitted directly through the top cord member by a compressive stress into the web member and is transmitted through the web to the bottom cord member where it is resolved into a horizontal or shear stress between the web and the bottom cord member, producing a tensional stress in the bottom cord member.

Further, since the distribution of weight and resulting forces in beams of the character referred to vary throughout their longitudinal extent, a material increase in strength and a reduction in weight can be effected by cambering the beams, longitudinally, that is, so that they are arched rather than straight.

The above has led the prior art to the establishment or development of fabricated beam structures wherein a marriage of several different alloys and/or gages of material can be employed and where the web can be cut to establish a camber in the resulting beam.

While many special and unique methods have been employed to secure or fix the cord members and webs together, in fabricated beam structures, welding has proven to be the most satisfactory and economical method or means.

One disadvantage in welding is the fact that sufficient stock must be provided so that excessive heat and resulting burning out or melting away of the stock going to make up the beams does not take place. With modern high speed welding methods, extremely thin members can be advantageously welded together, if bearing contact is established and maintained between the parts during the welding operation. If spaces occur between the parts, the welding operation is necessarily slowed down and excessive heat is generated, with resulting burning and/or melting away of the parts to be welded.

In the ordinary fabricated H or I-beam, due to the limited support for the cord members afforded by the opposing or adjacent edges of the webs and due to the tendency for the flanges to rotate relative to the edges of the webs, the flanges must be fixed to the webs by beads of weld along each side of the web to establish sufficient fillet therealong which fillet affords a gusseting effect and prevents rotation or rolling of the flanges relative to the webs and resulting breaking of the welds. This practice is costly and can only be effected in cases where the stock from which the beams are established is heavy enough so that it will not burn away excessively and will not warp, buckle or twist as a result of the two adjacent parallel rows of weld.

To provide additional lateral support for the flanges or chord members and to eliminate the necessity of welding the chord members to each side of the webs, the prior art has proposed crimping the longitudinal edges of the web to increase their lateral extent without increasing the gage of the stock from which they are established. This attempt failed due to the fact that crimping rendered the edges uneven and resulted in intermittent spaces between the chord members and webs, which spaces had to be filled with weld. While this can be done where the stock is sufficiently heavy to withstand fill welding, it is slow and costly and is limited to heavy beam structures.

It is well established that a panel established of light or thin stock and formed with transverse corrugations establishes an extremely stiff and structurally strong lightweight member. Such a member also provides a wide bearing support at the side edges for members secured thereto and results in an extremely strong and stable structure.

An object of the present invention is to provide a novel method of making a novel cambered, fabricated beam construction having a central corrugated web and upper and lower longitudinal flange or chord members fixed to the web as by welding.

In a beam construction, the web is subjected to shearing forces which tend to buckle the web. The strength of a web and its ability to withstand those forces which tend to buckle it is determined by the ratio between the height and the width of the web, that is, by the height divided by the width. By employing a corrugated web, the width factor in determining the strength of the web to resist buckling is subject to easy and convenient controls and can be increased as circumstances require without varying or changing the gage of the web stock and with a minimum increase in the quantity and weight of the stock which must be used.

It is an object of this invention to provide a novel method of making a fabricated beam construction comprising elongate, flat, laterally rigid chord members and an elongate, flexible corrugated web member arranged between and fixed to the chord members, at right angles thereto.

Another object of my invention is to provide a method of making a beam of the character referred to by first arranging the corrugated web and one chord member in straight parallel relationship with each other, whereby the chord member and the edge of the web adjacent thereto are in flat, uninterrupted bearing engagement with each other, then fixing these members together by an intermittent or uninterrupted weld between the web and the chord member, at one side of the web, then flexing the assembled web and chord member longitudinally along the central vertical axis of the web, to a predetermined cambered condition, then backing and/or supporting this sub-assembly in said flexed or cambered condition, then arranging the other or second chord member adjacent the other edge of the web and exerting substantially uniform pressure upon the second chord member throughout its longitudinal extent, whereby continuous uninterrupted contact is established between said second chord member and said other edge of the web and then fixing the said second chord member to the web by an intermittent or uninterrupted weld between said second chord member and web, adjacent one side of the web. (In practice, if desired, the chord members can be fixed to the web simultaneously.)

Another object of the present invention is to provide a novel method of making a novel beam-like structure of the character referred to that can be established in a sinuous or serpentine configuration or in the form of a unitary, rigid, angular frame line member having radiused corners.

A feature of the present invention is to provide, method of making a beam construction wherein the two chord members and the web can be advantageously formed of different alloys of different gage or weight, thereby obtaining a most efficient and/or effective ratio between weight of material and strength and a beam construction that can be easily, accurately and conveniently cambered during manufacture whereby a stronger, or structurally sounder beam, for weight of material employed, can be established, without waste of time, effort and material, as is experienced in the normal or conventional method of establishing fabricated, cambered beams wherein the webs are cut from plate or sheet stock to establish the desired camber.

A feature of my invention is to provide a novel method of making a fabricated beam wherein the web establishes wide bearing support for the chord members and greater stability against turning moments of force between the chord members and the web and whereby a single weld between each chord member and its adjacent edge of the beam is all that is required.

The various objects and features of my invention will be fully understood from the following detailed description of a typical preferred form and application of my invention, throughout which description reference is made to the accompanying drawings, in which:

FIG. 1 is a perspective view of a cambered, fabricated beam, provided by my invention;

FIG. 2 is a sectional view taken substantially as indicated by line 2—2 on FIG. 1;

FIG. 3 is a sectional view taken as indicated by line 3—3 on FIG. 1;

FIG. 4 is an exploded diagrammatic view of the parts going to make up my new beam construction;

FIG. 5 is a view showing the web and one chord member assembled and the other chord member arranged adjacent to its related side edge of the web;

FIG. 6 is a diagrammatic view showing the various parts held in fixed cambered relationship and preparatory to the last step of manufacture consisting of welding the other chord member to the web;

FIG. 7 is a diagrammatic view of another method of holding the parts together in fixed cambered relationship preparatory to welding the second chord member to the web.

The fabricated beam construction A that I provide is an elongate horizontally-disposed structure having a flat, horizontally-disposed top chord member B with flat top and bottom surfaces 10 and 11, straight parallel side edges 12 and straight ends 13; a flat, horizontally-disposed bottom chord member C having flat top and bottom surfaces 14 and 15, parallel side edges 16 and ends 17 and spaced below and extending parallel with the top chord member B, and an elongate horizontally-extending, vertically-disposed web D having vertical sides and ends and substantially horizontally-disposed parallel top and bottom edges 17 and 18.

The web D is established with a plurality of like vertically-extending corrugations throughout its longitudinal extent and is arranged between the chord members B and C with its top and bottom edges 17 and 18 in flat bearing engagement with the bottom and top surfaces 11 and 15 of the chord members B and C.

In the preferred carrying out of the invention, the central vertical plane of the web D intersects the central longitudinal axes of the chord members B and C.

Each chord member B and C is fixed to its adjacent edge 17 and 18 of the web D by a weld W. In the preferred carrying out of the invention, each weld is a continuous weld between the web and its related chord member, along one corner established by the junction of the web and chord, that is, at one side of the web.

Since the web and chord members are in bearing engagement with each other, no fill weld is required, thereby making it possible to weld at a rapid rate, with a minimum generation of heat and resulting burning of the metal stock establishing the chord members and web. Accordingly, the web and/or chord members can be advantageously established of light weight stock.

In practice, if the stock from which the web and chord members are established is sufficiently heavy, a weld can be applied at both sides of the web, adjacent each chord member, if desired, without departing from the broader aspects of the present invention.

In practice, the corrugations established in the web D can vary widely in form, but in any event, they must extend vertically, or normal to the longitudinal axis of the web, and must be coextensive with the vertical extent of the web. In the particular case illustrated, the corrugations establish a plurality of longitudinally spaced alternately laterally offset, flat, vertically disposed primary flats 20 having straight top and bottom edges and straight parallel side edge portions 23. The flats 20 occur in planes parallel with each other and with the central vertical plane of the web and the resulting beam A.

Extending between the opposing edge portions 23 of the adjacent primary flats 20 and integrally joined therewith, are substantially flat vertically-disposed intermediate or secondary flats 25 having normally straight upper and lower edges.

The flats 25 are angularly related to and normally intersect the central vertical plane of the beam. The flats 20 and 25 are equal in vertical extent and are preferably substantially equal in longitudinal extent.

It will be apparent that the flats 20 being parallel with the central longitudinal vertical plane of the web resist flexing of the web in a vertical plane and provide the web with great stiffness. On the other hand, the intermediate or secondary flats 25, being oblique or angularly related to the longitudinal central vertical plane of the web and beam, provide portions or stations throughout the longitudinal extent of the web which are less resistant to flexing of the web in its vertical plane and impart a limited, predetermined amount of vertical flexibility in the web.

In accordance with the above, when the web is flexed to establish a camber or arch, the primary flats 20 remain in flat planes and the intermediate or secondary flats 25 warp slightly. The opposing, straight-edge portions 23 of adjacent flats 20 are shifted from parallel, a slight amount, so that they diverge outwardly from the inside radius or diameter of the beam. Also, the angle between the adjacent edges of the flats 20 and 25 is more acute at the inside ends of the flats than at the outer ends thereof.

In establishing a cambered beam in accordance with the present invention, the stock from which the web D is established is corrugated. In practice, the stock can be coil stock and when corrugated, can be recoiled for the purpose of storage and/or transportation, as indicated at the left end of FIG. 4 of the drawings.

With the web stock thus formed, the upper and lower chord members B and C are provided from plate or coil stock as indicated in FIG. 4 of the drawings.

The web D and one chord member, for instance the upper chord member B, are arranged in straight parallel relationship with the upper edge 17 of the web in flat bearing engagement with the lower surface 11 of the chord member B, along the central axis of the chord member. With the web and upper chord member thus arranged, they are welded together by a single continuous weld W at one side of the web.

When the upper chord member and web are thus assembled, the lower chord member is then arranged adjacent the lower edge 18 of the web with said edge of the web extending along the central axis of the lower chord member C.

This assembly is then flexed and held in the desired cambered or arched condition by suitable pressure exerting means acting substantially uniformly throughout the longitudinal extent of the beam. Since the lower chord member C is not fixed to the lower edge of the web, the flats 20 and 25 of the web are free to shift and flex relative to each other and the lower edge of the web is free to shift relative to the lower chord member C, thereby assuring free flexing of the upper chord member and web and assuring proper mating and seating of the lower chord member with the web.

With the assembly thus arranged, the lower chord member is then welded to the web by a single uninterrupted weld W extending along one side of the web, thereby completing construction of the cambered beam A.

In the completed beam, the primary flats 20 are in the nature of flat struts or shear plates, spaced longitudinally and laterally of the beam and serve to hold the upper and lower chord members B and C in their said cambered condition. The secondary or intermediate flats 25 of the web are in the nature of gussets between the flats 20 and while not so efficient as the flats 20 in shear, also serve as shear plates.

The means provided for flexing and holding the assembly in cambered condition for and during the last welding operation is shown as including an elongate, horizontally-disposed press or jig having a fixed platen 30 with an inner surface 31 to engage and support the top surface 10 of the top chord member B and curved in accordance with the camber to be established in the beam; a shiftable head 32 having an inner surface 33 apaced from and opposing the surface 31 of the platen, said surface 31 being curved to conform with the camber desired to be established in the beam, and adapted to oppose the lower surface—of the lower chord member C; mechanical means 35 for shifting the head toward the beam assembly and the platen and hydraulic pressure exerting means 40 between the surface 33 of the head and the chord member C and adapted to exert uniform pressure on the assembly throughout its longitudinal extent and to urge the chord member C into uniform uninterrupted bearing engagement with the opposing edge of the web D, preparatory to welding said chord member to the web.

The means 35 is shown as including a plurality of jacks 36 carried by frame members 37 related to the platen and acting on the outer surface 38 of the head. The jacks can be mechanically operated or hydraulically operated, as desired, and serve to initiate the establishment of the camber in the beam.

The hydraulic pressure exerting means 40 includes an elongate flexible fluid-handling bladder 41 extending longitudinally of the inner surface 33 of the head, engageable with the lower surface—of the chord member C and connected with a suitable fluid supply 42.

In practice, the bladder 41 is a simple length of fabric jacketed, rubber fire hose, capped at one end and connected with a supply hose 43 at its other end, which supply hose extends from the fluid supply 42. The fluid supply 42 is shown as a simple water hydrant, and is preferably provided with a two-way valve 44 whereby the bladder can be advantageously drained of fluid as charged with fluid.

With the press set forth above, it will be apparent that the beam A that I provide can be easily, quickly and conveniently established without the exercise of special skill or the provision of costly equipment.

In the event that a single or limited number of especially cambered beams are to be established, of light stock, at a location where an apparatus or press, such as set forth above is not available, the same method of assembly can be carried out by arranging a plurality of blocks 60, of varying heights, on a prepared, flat surface, and in predetermined longitudinal spaced relationship, arranging the sub-assembly of the upper chord member B and the web D on the blocks, with the upper surface 10 of the chord member B disposed downwardly and resting on the blocks, then arranging the lower chord member C on the upwardly-disposed lower edge 18 of the web D and then flexing the assembly by loading the upwardly-disposed lower surface 15 of the lower chord member C with suitable weights, as for instance, sand bags 61. The lower chord member can be stabilized on the web during the loading operation and during the subsequent and final welding operation, by suitable standards or the like spaced along the opposite side edges thereof.

If, as pointed out in column 2, the chord members are fixed to the web simultaneously, the chord and web members are arranged and suitably supported in the apparatus and acted upon thereby to achieve the desired set, whereupon the members are welded together.

It will be apparent that the configuration of the web, that is the type and extent of corrugations established therein, must be varied for the most effective use of material when establishing beams of different materials, of different length, or different camber and of different depth or vertical extent. Accordingly, the particular web configuration shown in the drawings and described briefly above is only typical of one web configuration that might be employed in the carrying out of the present invention.

Having described only a typical preferred form and application of my invention, I do not wish to be limited to the specific details herein set forth, but wish to reserve to myself any modifications or variations that may appear to those skilled in the art and which fall within the scope of the following claims.

Having described by invention, I claim:

1. The method of manufacturing a cambered I-beam including, first establishing an elongate, web member with transverse corrugations throughout its longitudinal extent from an elongate metal strip having parallel side edges, then fixing an elongate first chord member to one edge of the web throughout the longitudinal extent thereof, then cambering the assembled first chord member and web, next arranging an elongate second chord member adjacent the other edge of the web and urging it into engagement therewith and finally fixing the second chord member to the web throughout the longitudinal thereof.

2. The method of manufacturing a cambered I-beam including, first establishing an elongate web with transverse corrugations from an elongate metal strip having parallel side edges, then fixing an elongate first chord member to one edge of the web by a continuous longitudinal weld, then cambering the assembled first chord member and web, next arranging an elongate second chord member adjacent the other edge of the web and urging it into engagement therewith by the application of pressure on the lower chord member throughout its longitudinal extent and finally fixing the second chord member to the web by a continuous longitudinal weld.

3. The method of manufacturing a cambered I-beam including, first establishing an elongate web with transverse corrugations from an elongate strip of coiled stock having parallel side edges, then fixing an elongate flat first chord member to one edge of the web by welding, with the plane of the chord at right angles to the plane of the web, next arranging an elongate flat second chord member adjacent the other edge of the web to occur in a plane parallel with the upper chord member, then cambering the assembly and urging the second chord member into bearing engagement with said other edge of the web by the application of pressure the second chord member and finally fixing the second chord member to the web by welding.

4. The method for manufacturing cambered I-beams including, establishing an elongate web with transverse corrugations from an elongate strip of stock having parallel side edges, then establishing an elongate flat first chord member from an elongate strip of stock and arranging the first chord member adjacent one edge of the web in a plane at right angles thereto and then fixing said web to said first chord member by a continuous weld adjacent one side of the web, then cambering the assembled first chord member and web in a plane parallel with the web, next establishing an elongate flat second chord member from an elongate strip of stock and arranging said second chord member adjacent the other edge of the web to occur at right angles to the web, and then securing the second chord member to the other edge of the web by a continuous weld between the web and said second chord member.

5. The method of manufacturing a cambered I-beam including, first establishing an elongate web with transverse corrugations from an elongate metal strip having parallel side edges, then arranging an elongate flat first chord member adjacent one side edge of the web with the plane of the first chord member at right angle to the plane of the web, next arranging an elongate flat second chord member adjacent the other side edge of the web to occur in a plane parallel with the first chord member, then cambering the assembly and urging the chord members into bearing engagement with the side edges of the web by the application of pressure on said chord members and, finally, fixing the chord members to the web by welding.

References Cited by the Examiner
UNITED STATES PATENTS

| | | | |
|---|---|---|---|
| 1,837,088 | 12/1931 | Watson | 52—729 |
| 1,911,413 | 5/1933 | Wait | 52—729 |
| 2,662,272 | 12/1953 | Macomber | 29—155 |
| 3,158,925 | 12/1964 | Edge | 29—155 |

JOHN F. CAMPBELL, *Primary Examiner.*

THOMAS H. EAGER, *Examiner.*